United States Patent

[11] 3,609,455

| [72] | Inventors | Jalal T. Salihi<br>Birmingham;<br>George J. Spix, Clawson, both of Mich. |
|---|---|---|
| [21] | Appl. No. | 8,560 |
| [22] | Filed | Feb. 4, 1970 |
| [45] | Patented | Sept. 28, 1971 |
| [73] | Assignee | General Motors Corporation<br>Detroit, Mich. |

[54] SYSTEM FOR PREVENTING VOLTAGE BUILDUP DURING REGENERATION AFTER DEENERGIZATION IN INDUCTION MOTORS
4 Claims, 4 Drawing Figs.

[52] U.S. Cl. .................................................. 317/13 R, 317/16, 317/20, 317/50
[51] Int. Cl. ........................................................ H02h 9/00
[50] Field of Search ............................................ 317/20, 13 R, 16, 49, 50

[56] References Cited
UNITED STATES PATENTS

| 2,911,583 | 11/1959 | Hawkins ..................... | 317/13 X |
| 3,047,746 | 7/1962 | Berkery ...................... | 317/20 X |

*Primary Examiner*—James D. Trammell
*Attorneys*—E. W. Christen, C. R. Meland and Albert F. Duke

ABSTRACT: A system for the prevention of voltage buildup in an induction motor which may be caused by the interchange of energy between capacitors connected across the motor winding and the motor winding after the motor is deenergized. In this system, saturable reactors are connected between the capacitors and the motor winding to prevent voltage buildup. The reactors are saturated by voltage supplied from the power source while the motor is energized thus providing minimum impedance to current supplied to the motor. On the other hand, the initial regeneration voltage of the motor when it is disconnected from the supply is inadequate to cause saturation of the reactors. Accordingly, the reactors prevent the interchange of energy between the motor winding and the capacitors, thereby precluding the generation of destructive voltages during periods of regeneration.

PATENTED SEP 28 1971

INVENTORS
Jalal T. Salihi, &
George J. Spix
BY
C. R. Meland
ATTORNEY

SYSTEM FOR PREVENTING VOLTAGE BUILDUP DURING REGENERATION AFTER DEENERGIZATION IN INDUCTION MOTORS

This invention relates to a system wherein voltage buildup during periods of regeneration by an AC induction motor after deenergization is limited by the operation of saturable reactors. In the system of this invention, voltage buildup across parallel resonant circuits comprised of a motor winding and capacitors connected across the motor winding is precluded by the action of saturable reactors interposed between the capacitors and the motor winding.

Under a variety of circumstances, it is desirable to connect capacitors across the input of AC induction motors. For example, capacitors are connected across induction motors to improve the power factor of the motor system. This capacitor-motor winding connection provides a resonant circuit with the result that high voltages can be produced across the parallel resonant circuit combination when the motor is disconnected from its power source.

Regeneration by induction motors, after the motors have been deenergized, has been observed to produce high voltages across capacitors connected at the input of motors. This regeneration phenomenon results from residual magnetic flux present in the induction motor during the coasting period following deenergization which causes an initial regeneration voltage which is sustained by kinetic energy extracted from the rotor and converted to electrical energy. Energy interchanges between the capacitors connected at the motor's input and the motor winding can cause voltage buildup during this period. This voltage buildup, realized during periods of regeneration after deenergization, may cause destruction of components and equipment connected to the motor.

It is, accordingly, an object of the present invention to prevent voltage buildup which may accompany regeneration subsequent to deenergization in induction motor systems wherein capacitors are connected across the input of the induction motor.

Another objective of the present invention is to provide control of voltage buildup after deenergization in induction motor systems of the type described without affecting the operation of the induction motor during those periods when the motor is energized from its power source.

Another object of this invention is to prevent voltage buildup during regeneration after the induction motor is deenergized without detracting from the function of the capacitors connected across the motor input during normal periods of operation.

Still another object of this invention is to provide a motor supply system wherein a frequency converter, comprised of a plurality of controlled rectifiers, has output terminals coupled to an induction motor and input terminals coupled to an alternating current generator and wherein saturable reactors prevent the interchange of energy between the winding of the motor and capacitors connected across the winding when the motor is deenergized. With this arrangement, the controlled rectifiers of the frequency changer are not subjected to high voltages that might otherwise be developed within the motor-capacitor circuit when the motor is deenergized.

Additional objects and advantages of this invention will be apparent in light of the description presented herein. The following figures which are incorporated in the description illustrate preferred embodiments of the present invention. in the drawings.

Figure 1:
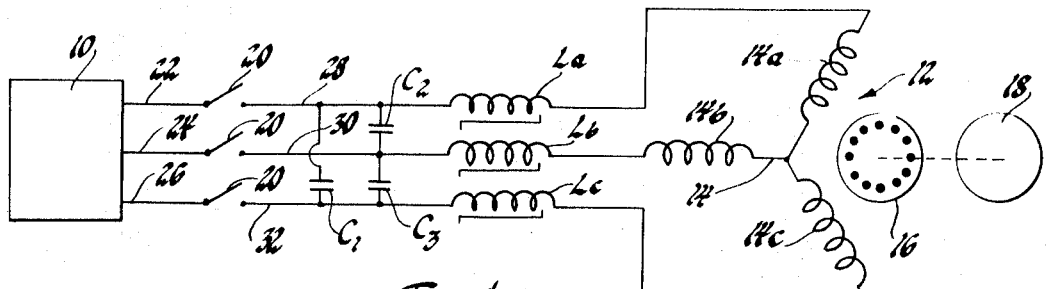
FIG. 1 is a circuit diagram of a polyphase AC induction motor system constructed in accordance with this invention employing saturable reactors to prevent destructive regeneration by the motor.

Referring now to the drawings and more particularly to FIG. 1, an AC induction motor system is depicted with capacitors connected across motor input conductors to provide beneficial effects such as power factor correction. In this figure, a three phase power source 10 provides energy to drive an induction motor 12. The induction motor 12 has a three-phase Y-connected winding 14 comprised of phase windings 14a, 14b, and 14c and a squirrel cage rotor 16. The rotor 16 of the motor is mechanically coupled to a load 18. Switches 20 are provided which allow the power source 10 to be disconnected from the motor to terminate motor operation.

The power source 10 is connected with conductors 22, 24 and 26 which in turn are connected respectively to one side of switches 20. The opposite sides of the switches 20 are connected respectively to power supply conductors 28, 30, and 32.

Capacitors $C_1$, $C_2$, $C_3$ are connected between pairs of the supply conductors 28, 30, and 32. Capacitor $C_1$ is connected between supply conductors 28 and 32, capacitor $C_2$ is connected between supply conductors 28 and 30, and capacitor $C_3$ is connected between supply conductors 30 and 32. As noted, these capacitors contribute desirable characteristics to the overall motor system performance.

Figure 2:
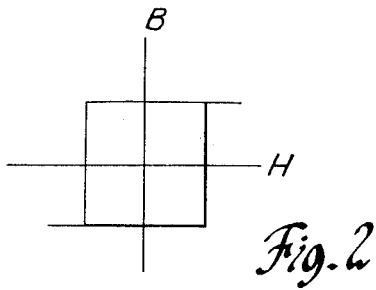
FIG. 2 is a characteristic curve representing a typical B–H plot for a saturable reactor of the type utilized in this invention.

The power supply system of this invention utilizes saturable reactors $L_a$, $L_b$, and $L_c$ connected respectively between power supply conductors 28, 30, and 32 and phase windings 14a, 14b, and 14c of the motor winding. The reactors are conventional saturable reactors, each having a winding on a core characterized by the substantially square loop characteristic curve associated with such reactors. This characteristic curve is depicted in FIG. 2 on B–H axes.

Saturable reactors are high impedance elements until saturation is complete. After saturation, saturable reactors are low impedance elements, the impedance then being primarily determined by the resistance of the winding. Saturation occurs when the flux level in the core material reaches the flux saturation value. Flux buildup in the reactor is related to the voltage supplied to the reactor's winding. The following proportionally defines the relationship between the voltage supplied to the reactor winding and the flux within the reactor:

$$\text{Flux} \alpha \int e\, dt$$

where $e$ represents voltage, and $t$ represents time. Accordingly, it is seen that the flux present in the reactor is proportional to the volt seconds applied to the reactor winding.

In operation, when the switches 20 of FIG. 1 are closed, the induction motor 12 is connected with and drawing power from the source 10. At this time, a large voltage is available to cause the saturable reactors to saturate. Accordingly, when power is being supplied to the motor from the source, saturable reactors $L_a$, $L_b$, and $L_c$ are saturated in very short time intervals. In this manner, it is seen that the saturable reactors represent low effective impedance elements during periods when the motor is energized and no noticeable effect on motor operation is produced.

When the switches 20 of FIG. 1 are opened, the power source 10 is disconnected from the induction motor system including the capacitors. The induction motor 12 functions as a generator during the coasting period following deenergization. The capacitors $C_1$, $C_2$, and $C_3$ being in shunt connection with the motor windings 14a, 14b, and 14c provide parallel resonant circuits. Inherent regeneration by the induction motor combined with the existence of the parallel resonant circuits noted provides an opportunity for voltage buildup. These voltage buildups can occur in the following manner:

a. residual flux in the motor causes the generation of voltage at the motor input during the transient period in which the motor is coasting and returning to its passive state, b. these small voltages from the motor operating as a generator are transferred to the capacitors, c. the capacitors reapply the voltages to the motor causing cumulative effects, and d. voltage buildup results.

This interaction between the capacitors and the induction motor winding is frequency sensitive. For voltage buildups to result, the capacitor-winding interchange must reinforce the motor's inherent regeneration. Accordingly, voltage buildup is affected by choice of capacitor and by shaft speed during regeneration.

Saturable reactors $L_a$, $L_b$, and $L_c$ afford control over the voltage buildup which can accompany regeneration subsequent to motor deenergization. With the saturable reactors in the circuit, voltage buildup is precluded by the fact that the very small voltages initially available are inadequate to cause saturation of the saturable reactors within necessary time intervals. The saturation time interval requisite for voltage buildup to occur is determined by the frequency of the generated voltage. Since the saturable reactors do not saturate, they represent elements having high effective impedances. As a result, the energy interchange between capacitors $C_1$, $C_2$, and $C_3$ and the phase windings 14a, 14b, and 14c of the induction motor is curtailed and voltage buildup is prevented.

Figure 4:
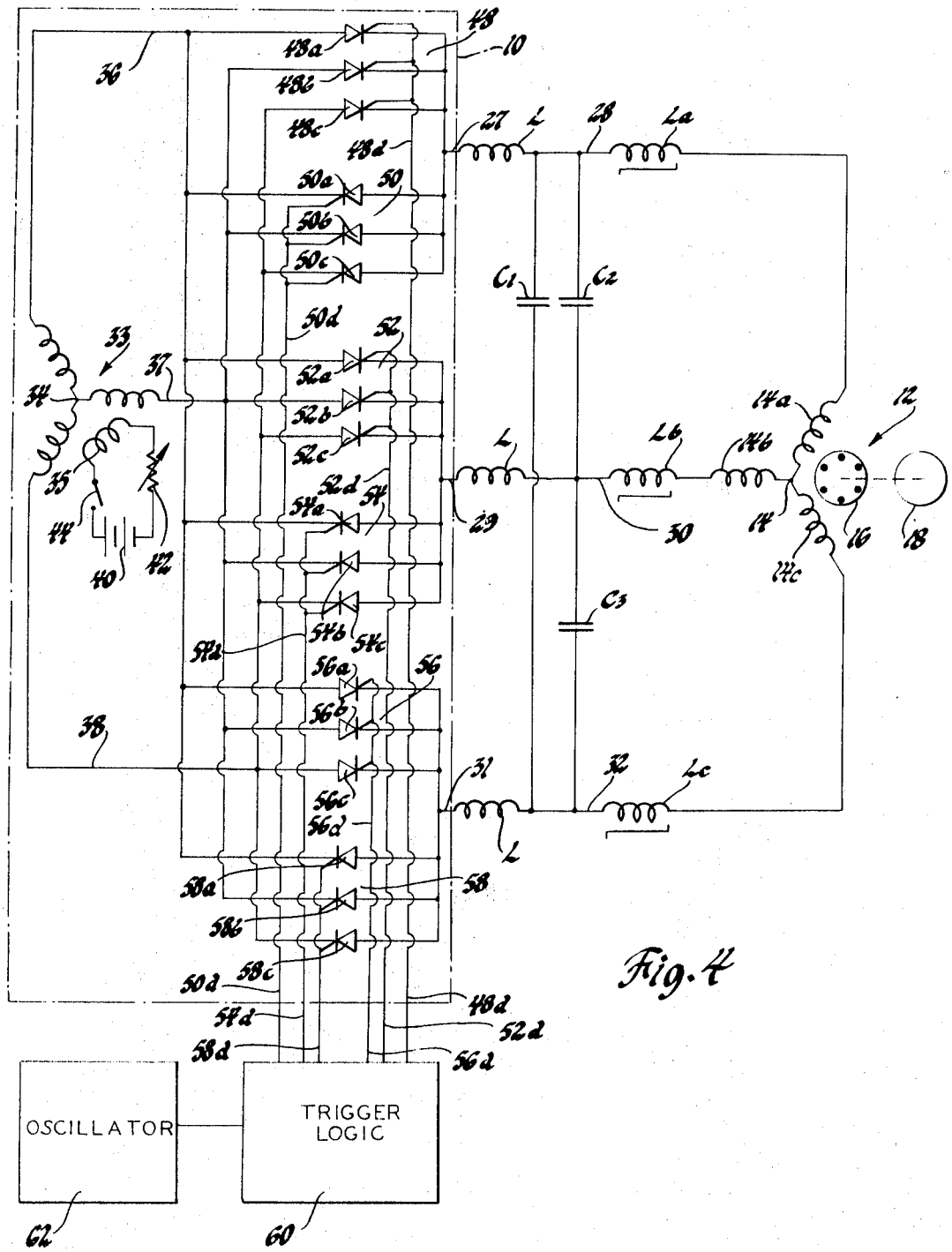
FIG. 4 is a circuit diagram of a polyphase AC induction motor system wherein power is supplied from a frequency changer or AC to AC converter and wherein the system utilizes saturable reactors in accordance with this invention to prevent regeneration by the motor.

Referring now to FIG. 4, a modified power supply system utilizing the principle of this invention is illustrated. In FIG. 4, as in FIG. 1, a three-phase power source 10 provides power to an AC induction motor 12 which drives a load 18. In FIG. 4, however, the three phase power source is comprised of an alternator and an AC to AC frequency changer or converter.

Referring to FIG. 4, an alternator 33 is provided which has a three-phase Y-connected output winding 34 and a field winding 35. The output winding 34 is connected to conductors 36, 37, and 38. The field circuit for this alternator 33 is comprised of the field winding 35 serially connected with a battery 40 through a variable resistor 42 and a switch 44. Both the resistor 42 and the switch 44 effect control over the current supplied to the field winding 35. Accordingly, the resistor 42 regulates the magnitude of the alternator's output voltage while the switch 44 determines the presence or absence of an output voltage from the alternator.

As noted, the alternator's three phase output is available on conductors 36, 37, and 38. These conductors serve as an input to a frequency converter or AC to AC converter comprised of an SCR bank including six groups of three SCR's denoted 48, 50, 52, 54, 56, and 58 with alphabetic notations a, b, c to distinguish the three SCR's in each grouping. Power from the alternator source 33 is transmitted through these SCR's to the induction motor 12.

Each of the three conductors 36, 37, and 38 is connected with six of the SCR's in the AC to AC converter. Each conductor is connected to the anodes of the three SCR's and to the cathodes of three additional SCR's. Conductor 36 is connected with the anodes of SCR's 48a, 52a, and 56a and to the cathodes of SCR's 50a, 54a, and 58a. Conductor 37 is connected with the anodes of SCR's 48b, 52b, and 56b and to the cathodes of SCR's 50b, 54b, and 58b. Conductor 38 is connected with the anodes of SCR's 48c, 52c, and 56c and to the cathodes of SCR's 50c, 54c, and 58c.

The gates of all SCR's carrying the same numeric indicia are connected together. For example, SCR gates for SCR's 48a, 48b, and 48c are all connected to conductor 48d. Likewise, SCR gates for SCR's 50a, 50b, and 50c are all connected to conductor 50d. The remaining gates associated with the balance of the SCR groups are likewise connected with group conductors 52d, 54d, 56d, and 58d, respectively.

On the output side of the AC to AC converter, the SCR's are connected together to provide a three-phase supply to the AC induction motor 12. The cathodes of the SCR's 48a, 48b, and 48c and the anodes of the SCR's 50a, 50b, and 50c are connected with conductor 27 which provides one output line from the AC to AC converter. In a like manner, the cathodes of the SCR's 52a, 52b, and 52c and the anodes of the SCR's 54a, 54b, and 54c are conductively connected with conductor 29. Also, the cathodes of the SCR's 56a, 56b, and 56c and the anodes of the SCR's 58a, 58b, and 58c are joined and conductively connected with conductor 31. These three conductors 27, 29, and 31 provide three-phase power to power the induction motor during periods when the motor is energized.

Capacitors $C_1$, $C_2$, and $C_3$ are connected across pairs of power supply conductors 28, 30, and 32 to improve the power factor of the motor system. Capacitor $C_1$ is connected across supply conductors 28 and 32, capacitor $C_2$ is connected across supply conductors 28 and 30, and capacitor $C_3$ is connected across supply conductors 30 and 32. As noted, these capacitors are employed to improve the operational characteristics of the motor system.

The AC to AC converter's three output conductors 27, 29, and 31 are connected, respectively, with the power supply conductors 28, 30, and 32 through inductors L. These inductors obviate destructive currents in the SCR's which could accompany the discharge of capacitors $C_1$, $C_2$, and $C_3$. These inductors functioning as chokes limit the time rate of change of current associated with the discharge of the capacitors $C_1$, $C_2$, and $C_3$.

Trigger signals on conductors 48d, 50d, 52d, 54d, 56d, and 58d are derived from a trigger logic network generally denoted 60 in combination with an oscillator denoted 62. Oscillator 62 is a variable frequency source. The pulse repetition rate of the gate pulses along the gate conductors can be varied by varying the frequency of the oscillator 62. Accordingly, it is seen that the oscillator 62 represents an operator control for governing the switching frequency of the AC to AC converter by controlling the trigger logic network 60.

Figure 3:
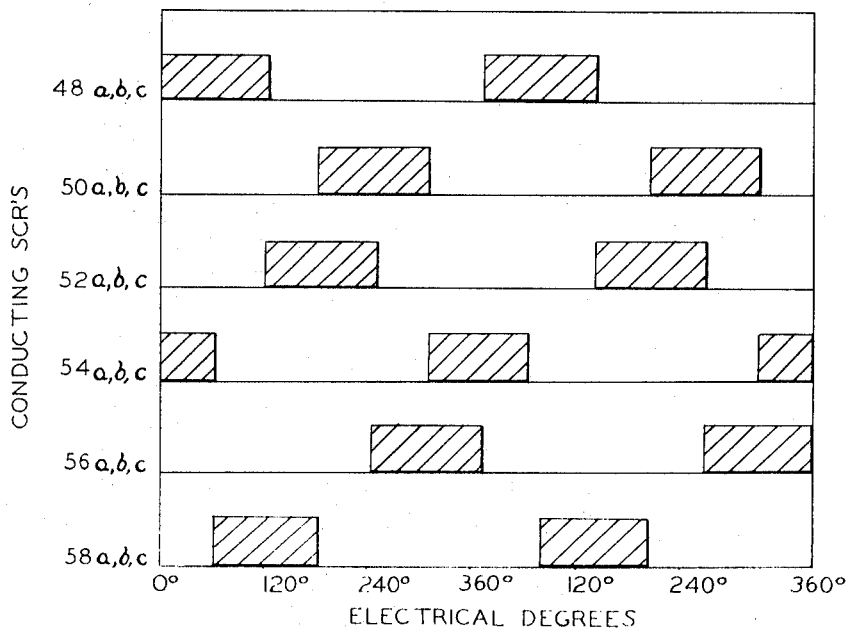
FIG. 3 shows graphically the switching conditions for control elements in FIG. 4.

The requirements for gate signals on the gate conductors are graphically illustrated in FIG. 3. Crosshatched areas of the graph indicate the conducting periods for the various groups of three controlled SCR's plotted against electrical degrees. This prescribes the switching sequence of the SCR's employed in the AC to AC converter.

Referring to FIG. 3, it is seen that from 0 to 60°, the groups of SCR's denoted 48 and 54 are gated conductive. This conductive period is initiated when a direct current signal is applied to the conductors 48d and 54d by the logic network 60 of FIG. 4. This direct current signal provides a gate signal to the gates of the SCR's denoted 48 and 54. Accordingly, the gates are biased positive with respect to the cathodes in these SCR's 48 and 54 and the two groups of SCR's are rendered conductive. An inspection of the electrical circuitry connected when SCR groups 48 and 54 are gated conductive reveals that phase windings 14a and 14b are connected with the alternator 33 during this time. It will be appreciated that a three phase full wave bridge network has been completed. As a result, conductors 27 and 29 provide a direct output for the bridge rectifier. For this 60-electrical-degree period, direct current is supplied to the induction motor 12 by the power supply conductors 28 and 30.

Between 60 and 120 electrical degrees, the gate signal is removed from the SCR's 54 while being maintained on the SCR's 48. Another gate signal is applied to the gates of the SCR's 58. Since the SCR's 54 are connected with an alternating current source, they will be commutated by the alternating current so that when the gate signal is removed they will be biased nonconductive. The three SCR's of a group do not turn off simultaneously die to the phase relationship of the polyphase alternating current from the alternator 33 and, in fact, the SCR's are turned off one at a time in accordance with the instantaneous polarities of their respective anodes and cathodes.

From 60 to 120 electrical degrees, it will be appreciated that SCR's 48 and 58 form a three phase full wave bridge rectifier connected with windings 14a and 14c. Therefore, between 60 and 120 electrical degrees, as illustrated in FIG. 3, the phase windings 14a and 14c are energized while phase winding 14b is deenergized.

FRom the foregoing it will be appreciated that during the first 120 electrical degrees, phase winding 14a was energized for the entire 120-degree period, whereas phase windings 14b and 14c were each separately energized for 60 of the 120 electrical degrees.

By following the chart shown in FIG. 3, it is apparent that each phase winding of the motor winding 14 is energized with both negative and positive current pulses having a duration of 120 electrical degrees. Accordingly, three-phase operation of the induction motor 12 obtains.

The trigger logic network 60 can include a conventional ring counter. When ring counters are employed, the output pulses necessary to accommodate the demands set forth in the graph of FIG. 3 are derived from the counter. In this arrangement, the oscillator 62 would control the repetition rate of pulses available from the counter.

In summarizing the operation of the AC to AC converter, it will be evident that a three-phase current is supplied to the three-phase winding of the induction motor due to the switching of the controlled rectifiers. The voltage applied to a given phase winding of the motor is essentially a square wave similar to that provided by a bridge rectifier. The frequency of this current is determined by the switching frequency of the groups of SCR's which in turn is subject to operator control. Even if the input power to the AC to AC converter has a fixed, constant frequency, it is noted that the output power from the AC to AC converter has a variable frequency subject to operator control.

The capacitors $C_1$, $C_2$, and $C_3$ are connected in the induction motor system, as noted above, for reasons such as power factor improvement. When the motor is deenergized, for instance when switch 44 is opened to open the alternator field circuit after a period of motor operation, energy exchanges between the motor winding 14 and the capacitors $C_1$, $C_2$, and $C_3$ would be possible but for the inclusion of saturable reactors $L_a$, $L_b$, and $L_c$. These saturable reactors $L_a$, $L_b$, and $L_c$ function in this circuit in the manner described above with respect to the induction motor system of FIG. 1 to preclude voltage buildup by limiting current during periods of regeneration.

In this modified power supply system wherein power is supplied to an induction motor through an SCR bank, the prevention of voltage buildup is of especial importance. SCR's employed in the AC to AC converter are susceptible to damage from high voltages. The saturable reactors afford protection of the SCR's by ensuring against voltage buildup.

FRom the foregoing it is seen that voltage buildup during regeneration after deenergization in induction motor systems is precluded by the operation of saturable reactors introduced in the induction motor power supply system. Avoidance of voltage buildup ensures against high voltages during regeneration periods which could endanger equipment and system components.

Although this invention has been described in terms of a three-phase system, the scope of the invention is not to be construed as being restricted to three-phase systems; but rather, it should be appreciated that this invention is generally applicable to single-phase and polyphase induction motor systems.

What is claimed is:

1. A power supply system for an AC induction motor, comprising: an AC induction motor having a motor winding, a pair of power supply conductors adapted to be connected to a source of power for supplying power to said motor winding, a capacitor connected across said power supply conductors, means connecting a first end of said motor winding to one of said power supply conductors, and a saturable two terminal circuit element connected between the second of said power supply conductors and a second end of said motor winding, said saturable circuit element capable of providing a saturated state of operation and an unsaturated state of operation and operating in its unsaturated state until caused to saturate by a voltage applied to its terminals, said saturable circuit element connected between one end of said capacitor and one end of said motor winding, whereby said saturable circuit element operatively isolates the motor winding from said capacitor to prevent voltage buildup during regeneration when the motor is deenergized by providing a high effective impedance while in its unsaturated state to current flowing between the motor winding and the capacitor and said saturable circuit element affords a low effective impedance while in its saturated state to current flowing from the power supply conductors to said motor winding when the motor is energized.

2. A power supply system for an AC induction motor, comprising: an AC induction motor having a motor winding, a pair of power supply conductors adapted to be connected to a source of power for supplying power to said motor winding, a capacitor connected across said power supply conductors, means connecting a first end of said motor winding to one of said power supply conductors, a saturable reactor having a reactor winding carried by a core formed of magnetic material, and means connecting said reactor winding between the second of said power supply conductors and a second end of said motor winding, said saturable reactor connected between one end of said capacitor and one end of said motor winding, whereby said saturable reactor operatively isolates the motor winding from said capacitor to prevent voltage buildup during regeneration when the motor is deenergized by providing a high effective impedance to current flowing between the motor winding and the capacitor and said saturable reactor affords a low effective impedance to current flowing from the power supply conductors to said motor winding when the motor is energized.

3. A power supply system for a polyphase AC induction motor, comprising: a polyphase AC induction motor having a polyphase winding; a plurality of power supply conductors adapted to be connected to a source of power for supplying power to said polyphase winding; a plurality of capacitors, one of said capacitors connected across each pair of said power supply conductors; and a plurality of saturable reactors, each saturable reactor having a reactor winding carried by a core, each reactor winding connected between a respective end of said polyphase motor winding and a respective one of said power supply conductors, said cores comprised of magnetic material having a substantially rectangular B–H characteristic curve, said saturable reactors being connected between said motor winding and said capacitors; whereby said saturable reactors operatively isolate the motor winding from said capacitors to prevent voltage buildup during regeneration when the motor is deenergized by providing a high effective impedance to current flowing between the polyphase motor winding and the capacitors and said saturable reactors afford a low effective impedance to current flowing from the power supply conductors to said polyphase motor winding when the motor is energized.

4. A power supply system for a polyphase AC induction motor, comprising: a polyphase AC induction motor having a polyphase winding; a frequency changing means, said frequency changing means having an input adapted to be connected with a polyphase AC source, said frequency changing means including a plurality of switching elements functioning as control devices regulating the frequency of output power; a plurality of power supply conductors connected to the output of said frequency changing means; a plurality of capacitors, one of said capacitors connected across each pair of said power supply conductors; and a plurality of saturable reactors, each saturable reactor having a reactor winding carried by a core, each reactor winding connected between a respective end of said polyphase motor winding and a respective one of said power supply conductors, said cores comprised of magnetic material having a substantially rectangular B–H characteristic curve, said saturable reactors being connected between said motor winding and said capacitors; whereby said saturable reactors operatively isolate the polyphase motor winding from said capacitors to prevent voltage buildup during regeneration when the motor is deenergized by providing a high effective impedance to current flowing between the polyphase motor winding and the capacitors and said saturable reactors afford a low effective impedance to current flowing from the frequency changing means to the polyphase motor winding when the motor is energized.